UNITED STATES PATENT OFFICE.

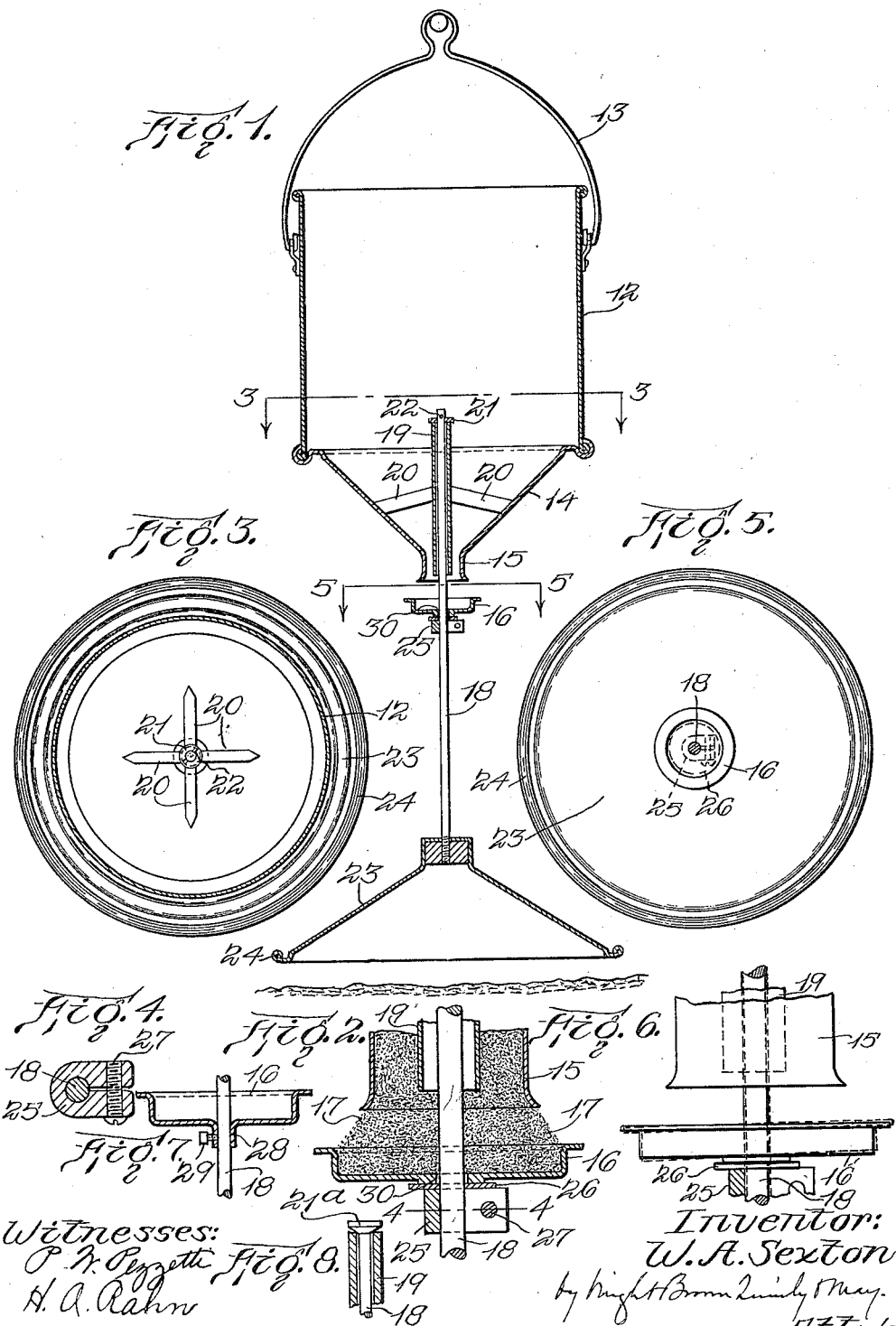

WILLIAM A. SEXTON, OF NEWTON, MASSACHUSETTS.

AUTOMATIC POULTRY-FEEDER.

1,141,981. Specification of Letters Patent. Patented June 8, 1915.

Application filed November 6, 1913. Serial No. 799,453.

*To all whom it may concern:*

Be it known that I, WILLIAM A. SEXTON, a citizen of the United States, and a resident of Newton, in the county of Middlesex and State of Massachusetts, have invented certain new and useful Improvements in Automatic Poultry-Feeders, of which the following is a specification.

This invention relates to poultry feeders for use in connection with so-called scratch feed, a mixture of cracked cereals such as corn, oats, etc., the feed being in a dry condition and adapted to flow through a relatively small outlet.

The invention relates particularly to a poultry feeder including a food receptacle with a contracted outlet and means for confining a bank of the food in an exposed position below the outlet, the food being adapted to be dislodged in small quantities from the bank as required for consumption, and means being provided for scattering the dislodged food and for causing the force exerted by a beak of a fowl in picking up some of the dislodged food to dislodge additional food from the bank.

The invention has for its object to provide improved means for causing the release and distribution of the food by the efforts of a fowl, and it consists in the improvements which I will now proceed to describe and claim.

Of the accompanying drawings: Figure 1 represents a longitudinal vertical section of a poultry feeder embodying my invention. Fig. 2 represents an enlargement of a portion of Fig. 1 showing an exposed bank of food supported below the outlet of the receptacle. Fig. 3 represents a section on line 3—3 of Fig. 1 and a plan view of the parts below said line. Fig. 4 represents a section on line 4—4 of Fig. 2. Fig. 5 represents a section on line 5—5 of Fig. 1 and a plan view of the parts below said line. Fig. 6 represents a view similar to Fig. 2 and illustrating the action which dislodges food from the bank. Fig. 7 represents a view similar to a portion of Fig. 1 showing a modification. Fig. 8 represents a sectional view showing another modification.

The same reference characters indicate the same parts in all the figures.

In the drawings:—12 represents a receptacle preferably adapted to be suspended from an overhead support by means such as a bail 13. The receptacle is provided with a conical bottom 14 having a contracted outlet 15 which is preferably circular. Means are provided for supporting below the outlet a tray 16 which is preferably circular and of greater diameter or area than the outlet, so that the tray is adapted to support a bank 17 of food below the outlet, the contents of the tray being adapted to support the contents of the receptacle so that when the tray is filled there will be no escape or dislodgment of the food until the tray is moved or jarred as hereinafter described. In the preferred embodiment of my invention the tray is supported by a vertical rod 18 which extends through the bottom of the tray and upwardly through the outlet 15, the receptacle being provided with a bearing 19 which oscillatively supports the rod 18. The bearing 19 is preferably a sheet metal tube attached to the bottom of the receptacle by arms 20 and extending from the lower end of the outlet upwardly into the interior of the receptacle. The upper end of the rod is provided with a head resting loosely on the upper end of the bearing 19, so that the bearing and enlargement support the rod and permit it to oscillate. The enlargement also constitutes a closure for the upper end of the bearing and prevents the food from entering the bearing and interfering with the oscillating movements of the rod in the bearing. Said head, as shown by Fig. 1, is formed by a washer 21 in contact with the bearing and engaged with the rod by means of a cotter pin 22 passing through the rod and resting on the washer. If desired, however, a head 21$^a$ may be formed on the rod as shown by Fig. 8. The rod is of smaller diameter than the interior of the bearing so that the rod and tray 16 are adapted to be displaced laterally or oscillatively as indicated by full and dotted lines in Fig. 6, the length and arrangement of the bearing being such that the somewhat closely packed food in the outlet 15 is prevented from impeding the movements of the rod, so that the rod is in contact only with the loose and laterally unconfined food between the tray and the outlet, this being freely displaceable by the rod. A movement of the tray from the position shown in full lines to that shown by dotted lines causes a limited dislodgment of food from the bank 17, the food falling over the edge of the tray. To the lower end of the rod 18 is detachably connected a deflector 23 preferably of conical form and arranged in the path of the dislodged food so that fragments of food falling on the deflector are caused to rebound outwardly and are scattered. The deflector is preferably adapted to confine on its upper surface fragments of food which fall upon it, the confining means being preferably an upwardly projecting lip or flange 24 formed on the margin of the deflector. When a fowl picks from the deflector fragments of food retained thereon, the impact of the fowl's beak on the deflector causes a sidewise movement of the deflector, the rod 18 and the tray 16, and thus effects a dislodgment of a portion of the food from the bank 17.

The tray 16 is preferably adjustable on the rod 18 toward and from the outlet 15 to vary the height and inclination of the bank 17. To this end, the rod may be provided with a vertically adjustable support 25 on which may rest a washer 26 in contact with the bottom of the tray, the support 25 being formed as shown by Fig. 4 and provided with a clamping screw 27. When said screw is loosened, the support 25 can be adjusted vertically on the rod, the tightening of the screw securing the support firmly to the rod. If desired, however, the tray may be provided with a hub or sleeve 28 adjustably secured to the rod by a set screw 29 as shown by Fig. 7.

In practice the device is supported with the deflector 23 suitably raised above the ground so that the deflector is free to be displaced in the manner described. The receptacle 12, the tray 16, and the deflector 23 are preferably made of sheet metal, and the rod 18 is preferably made of relatively small diameter so that it may be sprung laterally without swinging or oscillating from its upper end. I do not limit myself therefore to the means of oscillatively supporting the rod as a portion of the rod may have a close fit in the bearing 19, the spring of the rod below its upper end portion being relied upon to slightly move or agitate the tray and dislodge a portion of the food. In fact, the jar caused by the impact of a beak on the deflector is sufficient to dislodge food without any considerable or perhaps appreciable lateral movement of the deflector, rod and tray. A fowl may feed directly from a bank 17 in case the device is supported at a sufficiently low point. I have found that some fowls are sufficiently energetic to take food from the bank 17 by jumping from the ground, this act causing the liberation of more food than is taken by the fowl. It will be seen therefore that the deflector 23 may be dispensed with in case it is intended that the fowl shall feed directly from the tray, but I do not recommend this, it being desirable to employ the deflector and utilize it as a means for agitating the tray and dislodging food therefrom.

The tray is preferably adapted to be tipped independently of the rod 18 and support 25, and to this end the bottom of the tray is provided with an orifice 30 of considerably greater diameter than the rod 18, so that the tray can be tipped independently on its support.

I claim:

1. A poultry feeder comprising a receptacle having a contracted outlet in its bottom, a tray of greater area than the outlet, and means for supporting said tray below and spaced from said outlet, whereby the tray is adapted to support an exposed inclined bank of food below the outlet, and to permit a limited escape of the food, the supporting means and tray being movable to dislodge food from the bank, and provided, below the tray, with a food deflector adapted to retain fragments of the dislodged food and to be moved by the impact of a beak on the deflector.

2. A poultry feeder comprising a receptacle having a contracted outlet in its bottom, a fixed elongated bearing extending upwardly from the lower portion of the outlet into the receptacle, a rod having a closing head resting loosely on the upper end of the bearing, said rod extending downwardly through the bearing and outlet and being oscillatively supported by said head and bearing, and a tray secured to said rod and adapted to support an exposed bank of food below the outlet.

3. A poultry feeder comprising a receptacle having a contracted outlet in its bottom, a fixed elongated bearing extending upwardly from the lower portion of the outlet into the receptacle, a rod having a closing head resting loosely on the upper end of the bearing, said rod extending downwardly through the bearing and outlet and being oscillatively supported by said head and bearing, a tray secured to said rod and adapted to support an exposed bank of food below the outlet, and means on the lower portion of the rod whereby the rod and tray may be oscillated to dislodge food from said bank.

4. A poultry feeder comprising a receptacle having a contracted outlet in its bottom, a fixed bearing above said outlet, a rod downwardly extended through the outlet and oscillatively supported by said bearing, a tray secured to said rod and adapted to support an exposed bank of food below the outlet, and a deflector on the lower portion of the rod adapted to retain food dislodged from the bank and to be moved laterally by the impact of a beak to cause an oscillating movement of the tray and the dislodgment of food from the bank In testimony whereof I have affixed my signature, in presence of two witnesses.

WILLIAM A. SEXTON.

Witnesses:
C. F. BROWN,
P. W. PEZZETI.

Copies of this patent may be obtained for five cents each, by addressing the "Commissioner of Patents, Washington, D. C."